United States Patent
Miyao et al.

(10) Patent No.: US 7,551,209 B2
(45) Date of Patent: Jun. 23, 2009

(54) IMAGING APPARATUS AND METHOD FOR CONTROLLING WHITE BALANCE

(75) Inventors: Haruhiko Miyao, Mito (JP); Takahiro Nakano, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 312 days.

(21) Appl. No.: 11/715,425

(22) Filed: Mar. 8, 2007

(65) Prior Publication Data
US 2007/0159537 A1 Jul. 12, 2007

Related U.S. Application Data

(63) Continuation of application No. 10/321,842, filed on Dec. 18, 2002, now Pat. No. 7,199,821.

(30) Foreign Application Priority Data
Feb. 27, 2002 (JP) ............................. 2002-051841

(51) Int. Cl.
H04N 9/73 (2006.01)
(52) U.S. Cl. ................. 348/223.1; 348/348; 348/208.6; 348/227.1
(58) Field of Classification Search ............... 348/208.6, 348/223.1, 224.1, 227.1, 228.1, 348
See application file for complete search history.

(56) References Cited

U.S. PATENT DOCUMENTS

| 5,283,632 A | 2/1994 | Suzuki et al. |
| 5,550,587 A | 8/1996 | Miyadera |
| 5,617,141 A | 4/1997 | Nishimura et al. |

FOREIGN PATENT DOCUMENTS

| JP | 04-10887 | 1/1992 |
| JP | 4-010887 A | 1/1992 |
| JP | 4-170887 A | 6/1992 |
| JP | 4-170888 A | 6/1992 |
| JP | 5-308563 | 11/1993 |
| JP | 5-308563 A | 11/1993 |

(Continued)

OTHER PUBLICATIONS

Japanese Office Action, issued in Corresponding Japanese Patent Application No. JP 2002-051841, dated on May 22, 2007.

*Primary Examiner*—Lin Ye
*Assistant Examiner*—Gevell Selby
(74) *Attorney, Agent, or Firm*—McDermott Will & Emery LLP (57) ABSTRACT

An imaging apparatus has: a white balance control circuit for detecting an achromatic portion of an image of an object and controlling gains of the chrominance; an object distance detecting circuit for detecting a distance to the object; and a zoom value detecting circuit for detecting a zoom value of the optical system. The imaging apparatus further has: an object brightness detecting circuit for detecting brightness of the object; and a white balance control amount adjustment value setting circuit for forming a white balance control amount adjustment value to adjust a control amount in the white balance control circuit on the basis of object brightness information, object distance detection information, and zoom value information, wherein the white balance control amount is adjusted on the basis of the white balance control amount adjustment value.

6 Claims, 6 Drawing Sheets

FOREIGN PATENT DOCUMENTS

| | | |
|---|---|---|
| JP | 5-344530 | 12/1993 |
| JP | 6-339149 A | 12/1994 |
| JP | 7-075113 A | 3/1995 |
| JP | 2532968 B2 | 6/1996 |
| JP | 9-9136 A | 1/1997 |
| JP | 11-205806 A | 7/1999 |
| JP | 2000-4445 | 1/2000 |
| JP | 2000-004445 A | 1/2000 |
| JP | 3193456 B2 | 5/2001 |

FIG. 5B

IMAGING APPARATUS AND METHOD FOR CONTROLLING WHITE BALANCE

RELATED APPLICATIONS

The present application is a Continuation of U.S. application Ser. No. 10/321,842, filed on Dec. 18, 2002 now U.S. Pat. No. 7,199,821, which claims priority from Japanese Application No. JP 2002-051841 filed on Feb. 27, 2002, the contents of which are hereby incorporated by reference.

BACKGROUND OF THE INVENTION

The invention relates to an imaging apparatus such as video camera, digital still camera, or the like using an image pickup device and, more particularly, to an imaging apparatus having a white balance function and its method.

In recent years, video cameras have been spread and a video camera by which an image of higher picture quality can be easily photographed and which can be readily handled is demanded. As one of important requirements for making the image to have the high picture quality, it is necessary to prevent color deviation (hereinafter, referred to as white balance deviation) of an object to be photographed in the image. For example, it is important to avoid the occurrence of the color deviation (what is called coloring) such that a white portion of the image is colored. For this purpose, the video camera is equipped with an automatic white balance function for automatically correcting the color deviation (white balance deviation).

As an automatic white balance function which is used in the video camera or the like, white balance control can be mainly classified into two types: what is called an external photometric type such that control for directly detecting a color temperature of an illumination light source by a color temperature sensor or the like and correcting the white balance deviation on the basis of a detection result (hereinafter, such control is referred to as white balance control) is made; and what is called an internal photometric type such that the white balance deviation of an object to be photographed is detected from a video signal or the like and the white balance control is made on the basis of a detection result. In recent years, the internal photometric type is the mainstream in view of simplicity of a construction, costs, and the like.

As a method for the white balance control of the internal photometric type, there is a general method of correcting the white balance deviation by constructing a feedback loop such that chrominance signals such as color difference signals are formed from a signal (that is, image pickup signal) which is obtained by photographing an object, a white portion is discriminated from the chrominance signals, a white portion range of an image is set, and the chrominance signals included in the white portion range are extracted and integrated, thereby detecting the white balance deviation, and gains of the chrominance signals such as primary color signal R (red), primary color signal B (blue), and the like are controlled on the basis of a result of the detection.

As an example of such a method, for instance, there is a technique disclosed in Japanese Patent No. 3193456. According to white balance control in such a technique, two color difference signals (R−Y) and (B−Y) and a luminance signal Y are formed from primary color signals of R, G (green), and B which are obtained by color-separating an image pickup signal that is outputted from an image pickup device. Further, chrominance signals (R−B) and (R+B−2Y) obtained by base-converting the color difference signals by executing adding/subtracting processes to the color difference signals (R−Y) and (B−Y) are formed. A level of a threshold value provided in accordance with a level of the luminance signal Y is compared with those of the chrominance signals (R−B) and (R+B−2Y), respectively, thereby discriminating an achromatic portion (white portion) of the object. An extracting region (white portion extracting range) of the chrominance signals (R−B) and (R+B−2Y) is set. The chrominance signals (R−B) and (R+B−2Y) in the extracting region are extracted and integrated, respectively. The white balance deviation of the achromatic portion (white portion) of the object is detected from the signals obtained by the integration. By making the white balance control for changing the gains of the primary color signals R and B in accordance with the detected white balance deviation, the white balance deviation is corrected.

According to such white balance control, the chrominance signals included in the specific white portion extracting range on color temperature signal coordinates are regarded as signals according to the white balance deviation of the achromatic portion of the object, and the feedback control is made so as to correct the white balance deviation on the basis of those signals. Therefore, even if a signal of a chromatic portion in which the object is colored is included in the white portion extracting range (there is a case where if a photographing environment change and a color temperature of the light source changes, for example, even in the chromatic portion which is slightly colored, the levels of the chrominance signals (R−B) and (R+B−2Y) are equal to or less than the threshold value), there is a case of occurrence of an erroneous operation such that such a chromatic portion is regarded as an achromatic portion and the correcting operation of the white balance deviation is executed.

To reduce such an erroneous operation, in the white balance control according to the technique disclosed in the Japanese Patent No. 3193456, for example, there is used a method whereby the white portion extracting range is finely set to a plurality of regions every temperature, and by sequentially switching those regions, it is avoided that the signal of the chromatic portion of the object is included in the white portion extracting range.

However, as mentioned above, there is actually a case where it is difficult to accurately separate the white balance deviation of the achromatic portion of the object from the chromatic portion which is slightly colored. For example, in the case where an object is photographed so that a human face (object of a light skin color) occupies the whole picture plane, a portion of the human face is erroneously discriminated as an achromatic (white) portion and the white balance deviation is corrected. Thus, the erroneous operation of the correction of the white balance deviation such that an image in which the human face is faded into blue is obtained occurs.

As mentioned above, although the conventional white balance control is effective to the object having various saturation in the picture plane, there is a case where the proper correction of the white balance deviation cannot be performed to the picture plane in which the object having unbalanced saturation, particularly, the chromatic object in a light color occupies at a large ratio.

As a method of reducing the erroneous operation of the correction of the white balance deviation to the object having the unbalanced saturation, for example, a technique disclosed in Japanese Patent No. 2532968 has been known. In white balance control according to such a technique, an angle of view of a camera lens and a distance to the object are obtained, an effective area of an image pickup picture plane is obtained, and time constants of gain control of chrominance signals are changed in accordance with the effective area. If the effective area is small, a method of limiting or stopping the gain control of the chrominance signals is used. Therefore, in the case of photographing by setting the human face so as to be displayed on almost the whole image pickup picture plane, either an angle of view is narrowed due to the zooming operation or the distance to the object is close in such photographing. Therefore, the effective area in this case becomes small and, at this time, the control of the chrominance signals is limited or stopped. Thus, it is possible to prevent the human face from being faded into light blue.

However, in the conventional technique disclosed in Japanese Patent No. 2532968 mentioned above, in the case of photographing so that the white object or the object of the light source occupies almost the whole picture plane, since the effective area is small, the correcting operation of the white balance deviation is limited or stopped. That is, in spite of the fact that the white object exists, the white balance control is not made. There is, consequently, a problem such that the white balance deviation occurs in the white portion and picture quality of an image deteriorates.

In the case where the distance to the object is far and the object having various saturation exists in the picture plane, color components are not always equivalent in the picture plane. Therefore, if the white balance control is made in such a state, although the slight white balance deviation occurs, since the white portion is small on the picture plane, it is hardly conspicuous. On the other hand, in a photographing state where almost the whole picture plane is occupied by the white object by zooming or approaching the object, unless the white balance control is made, even if the white balance deviation is small, since the object occupies the screen at a large ratio, the white balance deviation is conspicuous.

SUMMARY OF THE INVENTION

It is an object of the invention to solve the foregoing problems and to provide an imaging apparatus which can make optimum correction of white balance deviation even in the case where an object which is photographed so as to occupy almost the whole picture plane is a white object or a light source.

To accomplish the above object, according to the invention, there is provided an imaging apparatus which has white balance control means for detecting an achromatic portion of an image of an object on the basis of chrominance signals formed from an output signal of an image pickup device derived via an optical system and controlling gains of the chrominance signals in accordance with a deviation amount of white balance detected from the achromatic portion, object distance detecting means for detecting a distance to the object, and zoom value detecting means for detecting a zoom value of the optical system and executes a correcting operation of the white balance deviation, comprising: object brightness detecting means for detecting brightness of the object; and white balance control amount adjustment value forming means for forming a white balance control amount adjustment value to adjust a white balance control amount of the white balance control means on the basis of object brightness information detected by the object brightness detecting means, object distance detection information detected by the object distance detecting means, and zoom value information detected by the zoom value detecting means, wherein the control amount of the white balance control means is adjusted on the basis of the white balance control amount adjustment value.

The white balance control amount adjustment value forming means has: object distance threshold value setting means for forming an object distance threshold value for discriminating a magnitude of the distance to the object on the basis of the object brightness information and the zoom value information; and white balance control amount adjustment value setting means for comparing the object distance detection information with the object distance threshold value information and obtaining the white balance control amount adjustment value according to a result of the comparison. Thus, even if the object photographed onto the whole picture plane is the white object or the light source, the white balance deviation can be optimally corrected.

The white balance control amount is a change amount of a speed or a gain at the time of controlling the gains of the chrominance signals. Thus, a control speed or a control amount at the time of controlling the gains of the chrominance signals can be varied.

The larger the zoom value is, the larger the object distance threshold value formed by the object distance threshold value setting means is. The darker the object brightness is, the larger the object distance threshold value is. Thus, even if the object distance is close (short), in the case of a bright object, the control amount of the white balance control can be adjusted.

The white balance control amount adjustment value changes in a binary or multivalue manner. Thus, the control amount of the white balance control can be finely varied.

The white balance control amount adjustment value changes like hysteresis characteristics in accordance with a change in object distance. Thus, the distance to the object, the zoom value, and the brightness change and even when the object distance detection information and the object distance threshold value information have close values, the fine switching operation of the control amount of the white balance control is unnecessary.

As mentioned above, even in the case where the object which occupies almost the whole image pickup picture plane is the white object or the light source, by changing the adjustment value for adjusting the white balance control amount on the basis of the information of the object brightness, the control amount of the white balance deviation is changed and the white balance deviation can be optimally corrected.

Other objects, features and advantages of the invention will become apparent from the following description of the embodiments of the invention taken in conjunction with the accompanying drawings.

DESCRIPTION OF THE EMBODIMENTS

Embodiments of the invention will be described hereinbelow with reference to the drawings.

Figure 1:
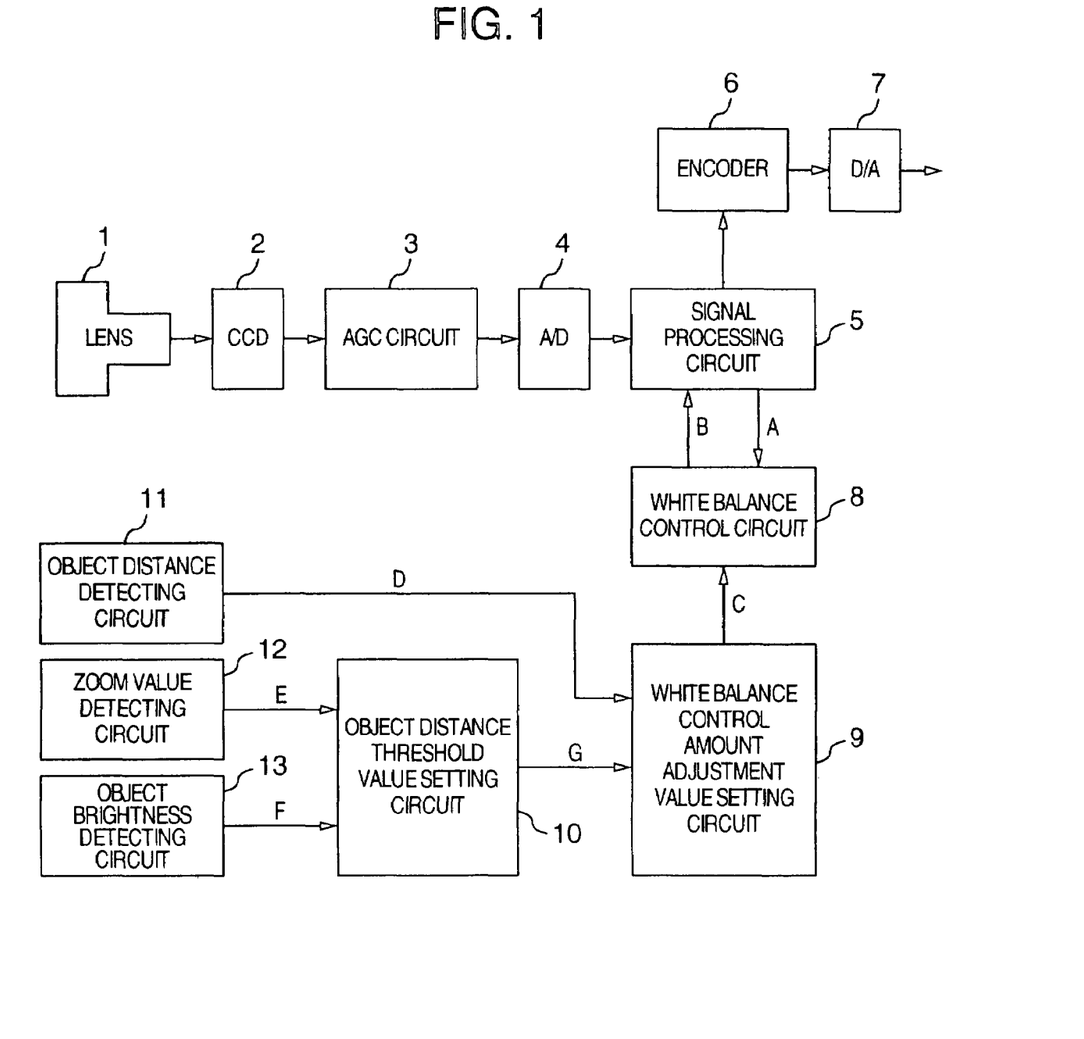
FIG. 1 is a constructional diagram showing an embodiment of an imaging apparatus according to the invention.

FIG. 1 is a constructional diagram showing an embodiment of an imaging apparatus according to the invention. Reference numeral 1 denotes a camera lens; 2 an image pickup device; 3 an AGC circuit (automatic gain control circuit); 4 an A/D converting circuit; 5 a signal processing circuit; 6 an encoder; 7 a D/A converting circuit; 8 a white balance control circuit; 9 a white balance control amount adjustment value setting circuit; 10 an object distance threshold value setting circuit; 11 an object distance detecting circuit; 12 a zoom value detecting circuit; and 13 an object brightness detecting circuit.

In the diagram, the camera lens 1 comprises a focusing lens and a zoom lens. The image pickup device 2 is a CCD image pickup device or the like. The image pickup device 2 photoelectrically converts an object image formed on an image pickup surface by the camera lens 1 and outputs an image pickup signal in an analog form (analog image pickup signal). The AGC circuit 3 amplifies the analog image pickup signal to a predetermined signal level. The A/D converting circuit 4 converts the analog image pickup signal amplified by the AGC circuit 3 into an image pickup signal in a digital form (digital image pickup signal). The signal processing circuit 5 forms a digital luminance signal and digital chrominance signals from the digital image pickup signal and executes various signal processes such as gamma correction and the like. The encoder 6 forms a digital television signal according to the standard television system such as an NTSC system or the like from the digital luminance signal and the digital chrominance signals outputted from the signal processing circuit 5. The D/A converting circuit 7 converts the digital television signal into a standard television signal in the analog form. The white balance control circuit 8 forms a gain control signal for controlling gains of primary color signals in the signal processing circuit 5 in accordance with information of white balance deviation. The object distance detecting circuit 11 detects a distance to the object to which a focal point has been set by the focusing lens of the camera lens 1 and forms distance information (assumed to be an object distance detection value D here) from a result of the detection. The zoom value detecting circuit 12 detects a zoom value (magnification, focal distance, angle of view, etc.) according to the zoom lens of the camera lens 1 and forms zoom value information (assumed to be a zoom magnification E here). The object brightness detecting circuit 13 detects brightness (illuminance, luminance, etc.) of the object and forms brightness information (assumed to be object illuminance F here). On the basis of the zoom magnification and the object illuminance, the object distance threshold value setting circuit 10 forms threshold value information (assumed to be an object distance threshold value G here) for discriminating a magnitude of the object distance detection value from the object distance detecting circuit 11 and sets it. The white balance control amount adjustment value setting circuit 9 compares the object distance detection value D with the object distance threshold value G mentioned above, forms information (hereinafter, referred to as a white balance control amount adjustment value C) for adjusting a control amount of the white balance control (a change in speed or gain at the time of controlling the gains of the primary color signals, or the like: hereinafter, referred to as a white balance control amount) on the basis of a result of the comparison, and sets it.

The operation of the embodiment will now be described.

The image pickup device 2 photoelectrically converts an object image formed on the image pickup surface by the camera lens 1 into an electric signal, thereby forming an analog image pickup signal in accordance with the object image and outputting it. The analog image pickup signal is amplified to the predetermined signal level by the AGC circuit 3, thereafter, converted into the digital image pickup signal by the A/D converting circuit 4, and supplied to the signal processing circuit 5.

In the signal processing circuit 5, digital primary color signals R, G, and B are formed from the inputted digital image pickup signal. The gains of the digital primary color signals R and B among them are controlled and the white balance deviation is corrected. Further, the digital primary color signals R, G, and B in which the white balance deviation has been corrected are subjected to processes such as gamma correction and the like. The digital luminance signal and digital color difference signals (R−Y) and (B−Y) are formed from the digital primary color signals R, G, and B to which the foregoing correcting process has been performed as mentioned above and outputted to the encoder 6. By using the digital color difference signals (R−Y) and (B−Y), by a method similar to the conventional technique, an achromatic (white) portion of the object is extracted, and white balance deviation of the achromatic portion is detected and supplied as white balance deviation information A to the white balance control circuit 8.

In the white balance control circuit 8, a control signal (white balance control signal in the block 8) indicative of the white balance control amount is formed on the basis of the white balance deviation information A which is supplied from the signal processing circuit 5. The object distance detection value D indicative of the distance to the object which is at present being photographed is supplied from the object distance detecting circuit 11 to the white balance control amount adjustment value setting circuit. The object distance threshold value G is supplied from the object distance threshold value setting circuit 10 to the white balance control amount adjustment value setting circuit. The white balance control amount adjustment value C is formed on the basis of the object distance detection value D and the object distance threshold value G. The white balance control amount of a white balance control signal B is adjusted on the basis of the white balance control amount adjustment value C. The gain control signal B of the primary color signals R and B according to the adjusted white balance control signal is formed. The gain control signal B is supplied to the signal processing circuit 5. As mentioned above, the gain control of the primary color signals R and B for the correction of the white balance deviation is made by the signal processing circuit 5.

As mentioned above, in a manner similar to the technique disclosed in Japanese Patent No. 2532968, a feedback loop is constructed in a manner such that the information of the white balance deviation is detected on the basis of the color difference signals which are obtained from the primary color signals R, G, and B in which the white balance deviation has been corrected by controlling the gains of the primary color signals R and B, the gains of the primary color signals R and B are controlled on the basis of this information, and the white balance deviation is corrected. The white balance deviation is corrected by such a feedback loop.

Further, according to the embodiment, in the white balance control circuit 8, when the gain control signal B of the primary color signals R and B is formed on the basis of the white balance deviation information A which is supplied from the signal processing circuit 5, by controlling the white balance control signal by using the white balance control amount adjustment value C, the white balance control amount is adjusted, thereby adjusting the gain control amounts of the primary color signals R and B. Thus, even to an object as a single body which occupies almost the whole picture plane, the correction of the white balance deviation can be precisely made.

Subsequently, the adjustment of the white balance control amount will be described.

The information E of the zoom magnification of the zoom lens of the camera lens 1 detected by the zoom value detecting circuit 12 and the information F of the object illuminance detected by the object brightness detecting circuit 13 are supplied to the object distance threshold value setting circuit 10. On the basis of those information, the object distance threshold value G is formed, set, and supplied to the white balance control amount adjustment value setting circuit 9. The object distance detection value D detected by the object distance detecting circuit 11 is also supplied to the white balance control amount adjustment value setting circuit 9 and compared with the object distance threshold value G. On the basis of a result of the comparison, the white balance control amount adjustment value C to adjust the white balance control amount is formed and supplied to the white balance control circuit 8. In the white balance control circuit 8, on the basis of the white balance control amount adjustment value C, the white balance control amount of the white balance control signal is adjusted. On the basis of it, the gain control signal B to control the gains of the primary color signals R and B is formed in the signal processing circuit 5.

Examples of the actual white balance deviation and a specific example of the object distance threshold value G corresponding to them will now be described with reference to FIGS. 2A, 2B, 2C, and 3.

Figure 2A:
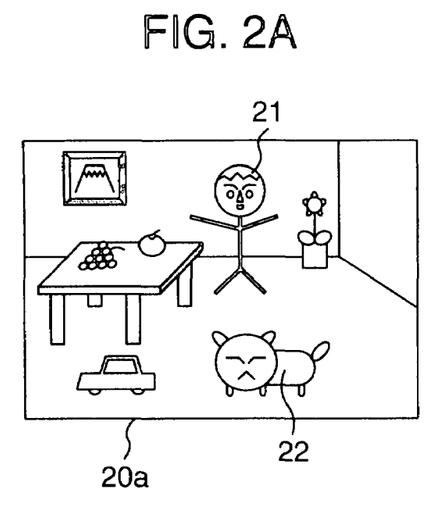
FIGS. 2A, 2B, and 2C are diagrams each showing an example of an image pickup picture plane in the case where an object is far, respectively.

FIG. 2A shows an image pickup picture plane 20a in the case where the object distance is far (long). Since objects 21, 22, and the like having various saturation exist in the image pickup picture plane 20a, this picture plane is in an effective state to make the white balance control as mentioned above.

Figure 2B:
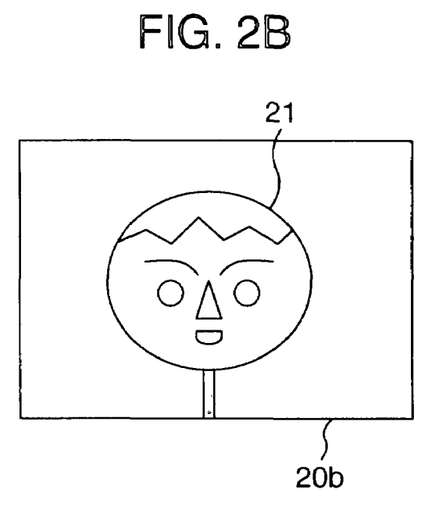

On the other hand, FIG. 2B shows an image pickup picture plane 20b in the case where the distance of the object 21 is close and illustrates a case where the face (object of a light skin color) of the human 21 occupies the image pickup picture plane 20b at a large ratio.

In this case, if the white balance control according to the conventional technique disclosed in Japanese Patent No. 3193456 mentioned above is made, the face of the human 21 is displayed in faded pale blue. If the white balance control for suppressing the erroneous operation to the chromatic object with a light color according to the technique disclosed in Japanese Patent No. 2532968 mentioned above is made, if the distance of the object 21 is close (reliability of color information in the picture plane is relatively low), the white balance control is stopped, thereby preventing the face of the human 21 from being displayed in faded pale blue.

Figure 2C:
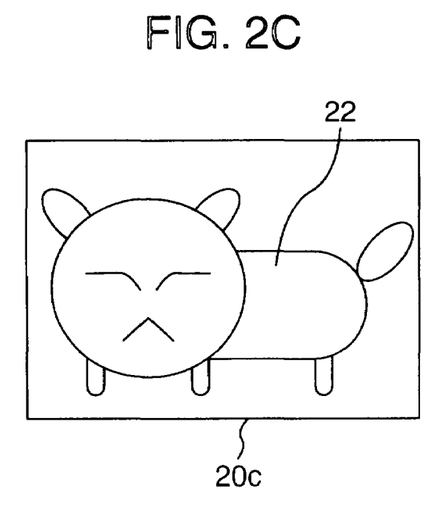

FIG. 2C shows an image pickup picture plane 20c in the case where the distance of the object 22 is close. In this case, the white dog (white object) 22 occupies the image pickup picture plane 20c at a large ratio. In such a state, according to the conventional technique disclosed in Japanese Patent No. 2532968 mentioned above, the effective area is discriminated to be small and the white balance control is not made. Therefore, even if slight white balance deviation occurs, white balance deviation such that the white dog 22 is conspicuous from the white color is caused.

According to the embodiment, in the case of the image pickup picture plane 20c as shown in FIG. 2C, it is detected that the white object 22 is white, and the operation for the white balance control is executed. Thus, the optimum white balance control is made.

Figure 3:
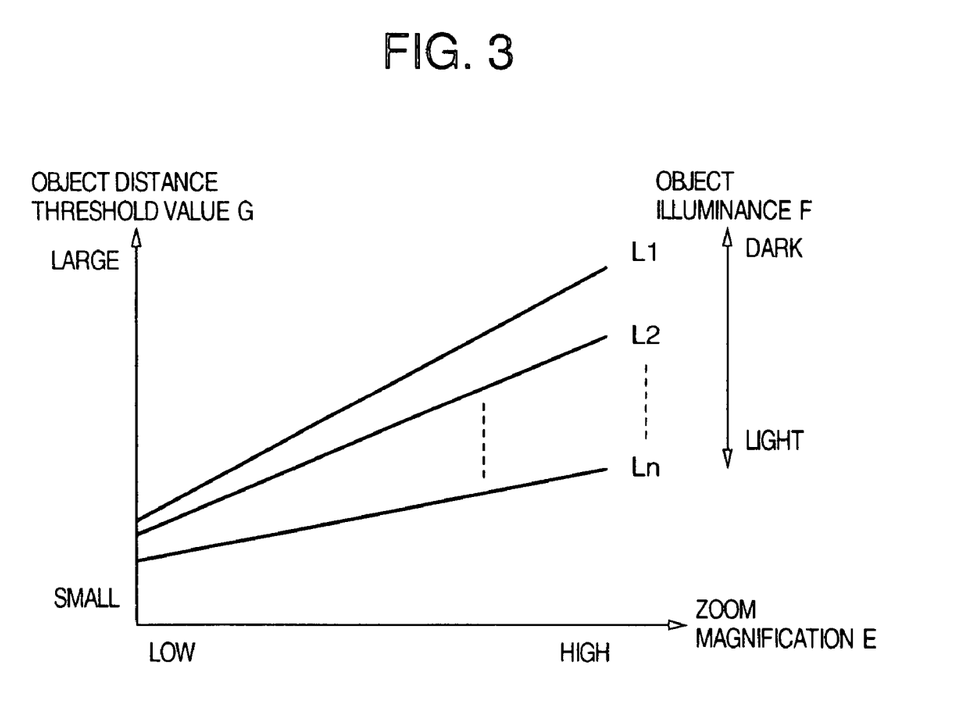
FIG. 3 is a diagram showing a specific example of a setting method of an object distance threshold value according to the embodiment shown in FIG. 1.

Subsequently, the object distance threshold value setting circuit 10 in FIG. 1 for this purpose will be explained. The object distance threshold value G is a threshold value for setting a boundary of the object distance in the case where the white balance control is made operative or stopped. FIG. 3 shows a specific example of a setting method of the object distance threshold value G.

In the embodiment, the object distance threshold value G is determined on the basis of the zoom magnification (angle of view of the image pickup picture plane) E and the object illuminance (brightness of the object) F. Therefore, first, the zoom magnification E will be described.

The image pickup picture planes 20b and 20c in FIGS. 2B and 2C can be also realized by zooming the image pickup picture plane 20a shown in FIG. 2A at a predetermined zoom magnification (angle of view) E. For example, assuming that the image pickup picture planes 20a shown in FIG. 2A is obtained at the zoom magnification=1 time and the object distance=3 m and the image pickup picture planes 20b and 20c shown in FIGS. 2B and 2C are obtained by photographing the objects at the object distance=0.3 m in the image pickup state, even if the objects are photographed at the zoom magnification=10 times by setting the object distance=3 m, the same picture planes as the image pickup picture planes 20b and 20c shown in FIGS. 2B and 2C are obtained. If the object distance threshold value G is set by using the image pickup picture planes 20b and 20c in FIGS. 2B and 2C as references, the object distance threshold value G can be set in proportion to the zoom magnification in a manner such that the object distance threshold value=0.3 m at the zoom magnification=1 time, the object distance threshold value=0.6 m at the zoom magnification=2 times, . . . , and the object distance threshold value=M×0.3 m at the zoom magnification=M times, respectively.

Even if the method whereby the object distance threshold value G to be set is changed in accordance with the zoom magnification E and, when the detected object distance detection value D is equal to or less than the object distance threshold value G, the correcting operation for the white balance deviation is stopped as mentioned above is merely used, when the chromatic object 21 with a light color occupies almost the whole picture plane like an image pickup picture plane 20b shown in FIG. 2B, the object distance threshold value G can be set so as to stop the correcting operation for the white balance deviation, so that it is possible to cope with it and is effective. However, if the object 22 is a white (achromatic) object like an image pickup picture plane 20c shown in FIG. 2C, it is impossible to cope with it and is ineffective. With respect to the object 22, actually, if it has a light color due to a color temperature although it is white, when the distance of the object 22 is equal to or less than the object distance threshold value G which is set in accordance with the zoom magnification E, since the correcting operation for the white balance deviation is stopped, the object 22 is displayed as a color deviated object.

In the embodiment, even if the detected object distance is equal to or less than the object distance threshold value G, the correcting operation for the white balance deviation is executed to the white (achromatic) object 22 as shown in FIG. 2C or a bright object such as a light source, thereby making it possible to cope with it. This point will be described hereinbelow.

When the object distance is far, that is, in the case where the objects having various saturation easily appear in the image pickup picture plane (reliability of the color information in the image pickup picture plane is relatively high), the correcting operation for the white balance deviation is executed. On the contrary, when the object distance is close, that is, in the case where the objects having deviated saturation easily appear (reliability of the color information in the image pickup picture plane is relatively low), if the white balance control is merely stopped or its control speed is merely reduced, even when the objects having various saturation exist in the image pickup picture plane, their color components are not always equivalent. Even if the correcting operation for the white balance deviation is executed when the object distance is far, although slight white balance deviation (color deviation) is caused, it is hardly conspicuous. However, when the white object occupies the image pickup picture plane at a large ratio, if the white balance control is stopped or its control speed is reduced, the color deviation becomes easily conspicuous. Generally, if there is a light source object in the image pickup picture plane, it is necessary to make the white balance control on the basis of the color temperature of the light source.

From the above point, in the embodiment, since the white object or the light source object is brighter than the chromatic object, even in the case of the object which occupies the whole image pickup picture plane at a large ratio, if this object is a relatively bright object such as white object, light source, or the like, the object distance threshold value G is changed in accordance with the brightness so as to permit the correcting operation for the white balance deviation in accordance with the brightness. "Permit" used here denotes that the stop of the correcting operation for the white balance deviation is cancelled or the white balance control amount is adjusted.

Subsequently, the setting method of the object distance threshold value G will be described with reference to FIG. 3. FIG. 3 is a diagram showing a specific example of the object distance threshold value G according to the zoom magnification E and the object illuminance F. It is assumed here that when the distance (object distance detection value) D to the object is smaller than the set object distance threshold value G, the correcting operation for the white balance deviation is stopped or limited.

In the diagram, each of characteristics L1, L2, ..., and Ln shows a change in object distance threshold value G corresponding to the zoom magnification E for every object illuminance F. In any of those characteristics, the object distance threshold value G is enlarged in accordance with an increase in zoom magnification E (as the angle of view is narrowed). The object distance threshold value G is decreased like L1, L2, ..., and Ln as the object illuminance F becomes bright. In any of the characteristics L1, L2, ..., and Ln of the object distance threshold value G, if the object distance detection value D lies below the characteristics of the object distance threshold value G, the correcting operation for the white balance deviation is stopped or limited.

By setting in a manner such that the object distance threshold value G is enlarged with an increase in zoom magnification E and the object distance threshold value G is decreased as the object illuminance F becomes bright as mentioned above, in the case of the bright object such as white object or light source, the object distance threshold value G is decreased. Thus, even if the distance to the object is close, the correcting operation for the white balance deviation can be permitted. Therefore, even in the case of photographing in a manner such that the white dog 22 as shown in FIG. 2C is displayed on the whole image pickup picture plane 20c, the correcting operation for the white balance deviation is executed and the color deviation of the object 22 can be avoided.

Although it is assumed that the object distance threshold value G is proportional to the zoom magnification E in FIG. 3, the invention is not limited to it but the object distance threshold value G can be also changed in a multistage or curve-shaped manner.

As mentioned above, in the embodiment, by setting the object distance threshold value G to the value according to the zoom magnification E, and further, the object illuminance F, a situation that the erroneous color correction is made to the chromatic object with a light color by stopping or limiting the white balance control is prevented. The color correction can be made to the white (achromatic) object or the light source object by making the proper white balance control.

Although it is assumed that the object distance threshold value G is proportional to the zoom magnification E in FIG. 3, the invention is not limited to it but the object distance threshold value G can be also changed in a curve-shaped manner by using an arbitrary higher-degree function f(E). The object distance threshold value G can be also changed in a multistage manner by a method whereby a plurality of object distance threshold values G1, ..., and Gn are arbitrarily set in accordance with predetermined zoom magnification E1, ..., and En and interpolated by an arbitrary function f(E)', or the like.

Subsequently, the white balance control amount adjustment value C which is set by the white balance control amount adjustment value setting circuit 9 in FIG. 1 will be described.

As an example of the white balance control amount adjustment value C, a coefficient in a range of 0 to 1 can be used. In the white balance control circuit 8, by multiplying the white balance control amount (assumed to be an amount according to a speed here) by the white balance control amount adjustment value C, the adjustment of the white balance control amount can be made. As white balance control, when the white balance control amount adjustment value C=1, the ordinary correcting operation for the white balance deviation is executed, when the white balance control amount adjustment value C=0, the correcting operation for the white balance deviation is stopped, and when 0<the white balance control amount adjustment value C<1, the correcting operation for the white balance deviation is limited. This point will be explained hereinbelow with reference to FIGS. 4A, 4B, 4C, 4D, 4E, 5A, and 5B.

FIGS. 4A to 4D are diagrams each showing a specific example of the setting method of the white balance control amount adjustment value C which is set by the white balance control amount adjustment value setting circuit 9. An axis of abscissa denotes a count value of a counter, which will be explained hereinlater, and an axis of ordinate indicates the white balance control amount adjustment value C.

Although not shown, the white balance control amount adjustment value setting circuit 9 shown in FIG. 1 is provided with: comparing means for comparing the object distance detection value D and the object distance threshold value G which are supplied; and an object distance discriminating counter to which a comparison result is supplied and which discriminates the object distance. When the comparison result of the comparing means indicates that the object distance is far and if (the object distance detection value D)>(the object distance threshold value G)   (1), the object distance discriminating counter increments (increases) the count value. When the comparison result of the comparing means indicates that the object distance is close and if (the object distance detection value D)≦(the object distance threshold value G)   (2), the object distance discriminating counter decrements (decreases) the count value. The white balance control amount adjustment value C is set to a value within the range of 0 to 1 in accordance with the count value of the object distance discriminating counter. The object distance discriminating counter starts the operation simultaneously with the start of a predetermined operation such as turn-on of a power source, start of recording, or the like and counts at a predetermined time interval (for example, every 5 frames when assuming 30 frames/sec) in response to the comparison result of the object distance detection value D and the object distance threshold value G from the comparing means. In the object distance discriminating counter, both or either one of an upper limit and a lower limit of the count value have/has been predetermined as limit values (a limit value). If the counting operation is executed up to the limit value, the counting operation is stopped so that the count value is not increased any more (in the case where the upper limit value has been set) or is not decreased any more (in the case where the lower limit value has been set).

Figure 4A:
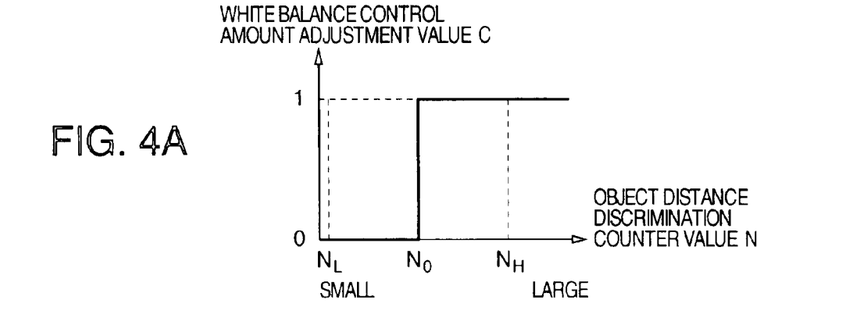
FIGS. 4A, 4B, 4C, 4D, and 4E are diagrams each showing a specific example of a white balance control amount adjustment value in the embodiment shown in FIG. 1 and a flowchart for the operation.

The first specific example shown in FIG. 4A shows a case where the white balance control amount adjustment value C can be set to only the value of either "0" or "1".

That is, when the object distance discriminating counter starts the operation, if the object distance is far (upper side of the graph in FIG. 3), since the expression (1) is satisfied, the object distance discriminating counter counts up, so that the count value increases. When the count value reaches a predetermined threshold value $N_0$, the object distance is determined to be far and the white balance control amount adjustment value C is set to "1". Until this state is obtained, the white balance control amount adjustment value C of "0" is outputted from the object distance discriminating counter. This value is supplied to the white balance control circuit 8 (FIG. 1) and multiplied by the white balance control amount. Therefore, the gain control signal B of the primary color signals R and B is not formed and the correcting operation for the white balance deviation is not executed. However, if the white balance control amount adjustment value C of "1" is started to be outputted from the object distance discriminating counter, the correcting operation for the white balance deviation is executed.

When the object approaches from such a state and reaches a near position (on the graph) where the expression (2) is satisfied, the object distance discriminating counter counts down each time the comparison result is supplied from the comparing means at the foregoing period and the count value decreases. When the count value reaches a value less than the threshold value $N_0$ (lower side of the graph), the object distance is determined to be close and the white balance control amount adjustment value C is set to "0". It will be understood from the above explanation that the correcting operation for the white balance deviation is stopped.

By changing the time interval or the operation switching threshold value $N_0$ to be used for comparison and discrimination, following performance of the correcting operation for the white balance deviation can be changed. The stable correcting operation for the white balance deviation can be executed even for a change in object distance due to the focusing lens (for example, auto-focusing lens) of the camera lens 1 (FIG. 1) or a change in object distance or object illuminance which suddenly occurred.

According to the first specific example shown in FIG. 4A, the white balance control amount adjustment value (in this case, white balance control speed) C has been changed in a binary manner. However, according to the second specific example shown in FIG. 4B, the white balance control amount adjustment value (in this case, white balance control speed) is changed in a multistage manner (also including a proportional case). In the second specific example, when the count value of the object distance discriminating counter lies within a range from a threshold value $N_1$ to a threshold value $N_2$, the white balance control amount adjustment value C is set to a value between "0" and "1", thereby enabling the white balance control amount to be limited.

Figure 4B:
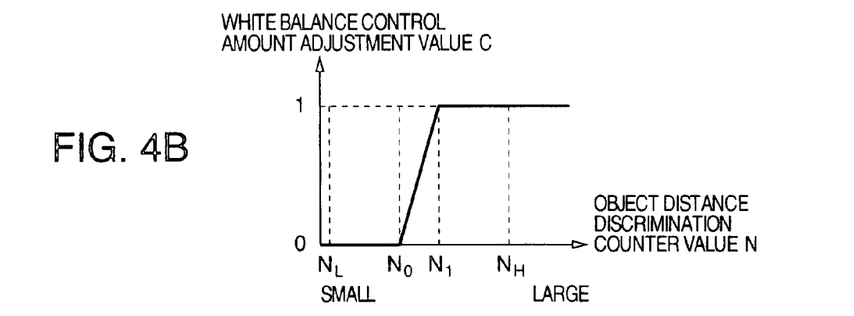
Figure 4C:
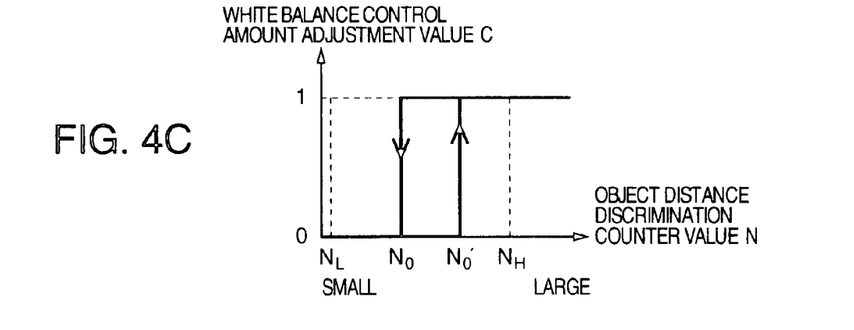
Figure 4D:
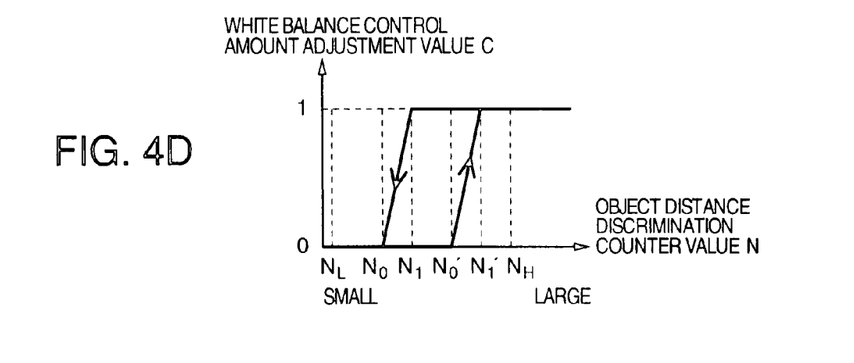

Further, according to the specific examples shown in FIGS. 4C and 4D, hysteresis characteristics are provided for the specific examples shown in FIGS. 4A and 4B, a path of the change in white balance control amount adjustment value C at the time when the count value of the object distance discriminating counter increases and that when it decreases are made different, thereby preventing the correction of the white balance deviation from being finely switched and further improving the stability of the correcting operation for the white balance deviation corresponding to the change in object distance or the object illuminance.

The specific examples of the setting method of the white balance control amount adjustment value C shown in FIGS. 4A to 4D will now be described with reference to the flowchart of FIG. 4E.

First, when the setting of the white balance control amount adjustment value C is started, the processing routine advances to step ST100 and the object distance detection value D and the object distance threshold value G are compared. When $$D \leq G,$$

ST110 follows. When $$D > G,$$

ST120 follows.

When the processing routine advances to ST110, the object distance discrimination count value N (an initial value is assumed to be an object distance discrimination count lower limit value $N_L$) and the object distance discrimination count lower limit value $N_L$ are compared. When $$N \leq N_L,$$

ST200 follows. When $$N > N_L,$$

ST111 follows.
When the processing routine advances to ST111,
the object distance discrimination count value N is decreased and, thereafter, ST200 follows.

When the processing routine advances to ST120, the object distance discrimination count value N and the object distance discrimination count upper limit value $N_H$ are compared. When $$N \geq N_H,$$

ST200 follows. When $$N < N_H,$$

ST121 follows.
When the processing routine advances to ST121,
the object distance discrimination count value N is increased and, thereafter, ST200 follows.

When the processing routine advances to ST200, an object distance discrimination count threshold switching value S (an initial value is assumed to be 0) is discriminated. When $$S=0,$$

ST210 follows. When $$S=1,$$

ST220 follows.

When the processing routine advances to ST210, the object distance discrimination count value N and the object distance discrimination count threshold values $N_0$ and $N_1$ are compared. When $$N \geq N_0,$$

ST211 follows. When $$N > N_1,$$

ST212 follows. When $$N_0 < N \leq N_1,$$

ST213 follows.
 When the processing routine advances to ST211,
  the white balance control amount adjustment value C=0 is set and, thereafter, ST300 follows.
 When the processing routine advances to ST212,
  the white balance control amount adjustment value C=1 is set and, thereafter, ST300 follows.
 When the processing routine advances to ST213,
  the white balance control amount adjustment value $C=(N-N_0)/(N_1-N_0)$ is set and, thereafter, ST300 follows.

When the processing routine advances to ST220, the object distance discrimination count value N and object distance discrimination count threshold values $N_0'$ and $N_1'$ are compared. When $$N \leq N_0',$$

ST221 follows. When $$N > N_1',$$

ST222 follows. When $$N_0' < N \leq N_1',$$

ST223 follows.
 When the processing routine advances to ST221,
  the white balance control amount adjustment value C=0 is set and, thereafter, ST300 follows.
 When the processing routine advances to ST222,
  the white balance control amount adjustment value C=1 is set and, thereafter, ST300 follows.
 When the processing routine advances to ST223,
  the white balance control amount adjustment value $C=(N-N_0')/(N_1'-N_0')$ is set and, thereafter, ST300 follows.

When the processing routine advances to ST300, the white balance control amount adjustment value C is discriminated. When $$C=0,$$

ST310 follows. When $$C=1,$$

ST320 follows. When $$0<C<1,$$

ST400 follows.
 When the processing routine advances to ST310,
  the object distance discrimination count threshold switching value S=0 is set and, thereafter, ST400 follows.
 When the processing routine advances to ST320,
  the object distance discrimination count threshold switching value S=1 is set and, thereafter, ST400 follows.
 When the processing routine advances to ST400, the setting of the white balance control amount adjustment value C is finished.

Figure 4E:
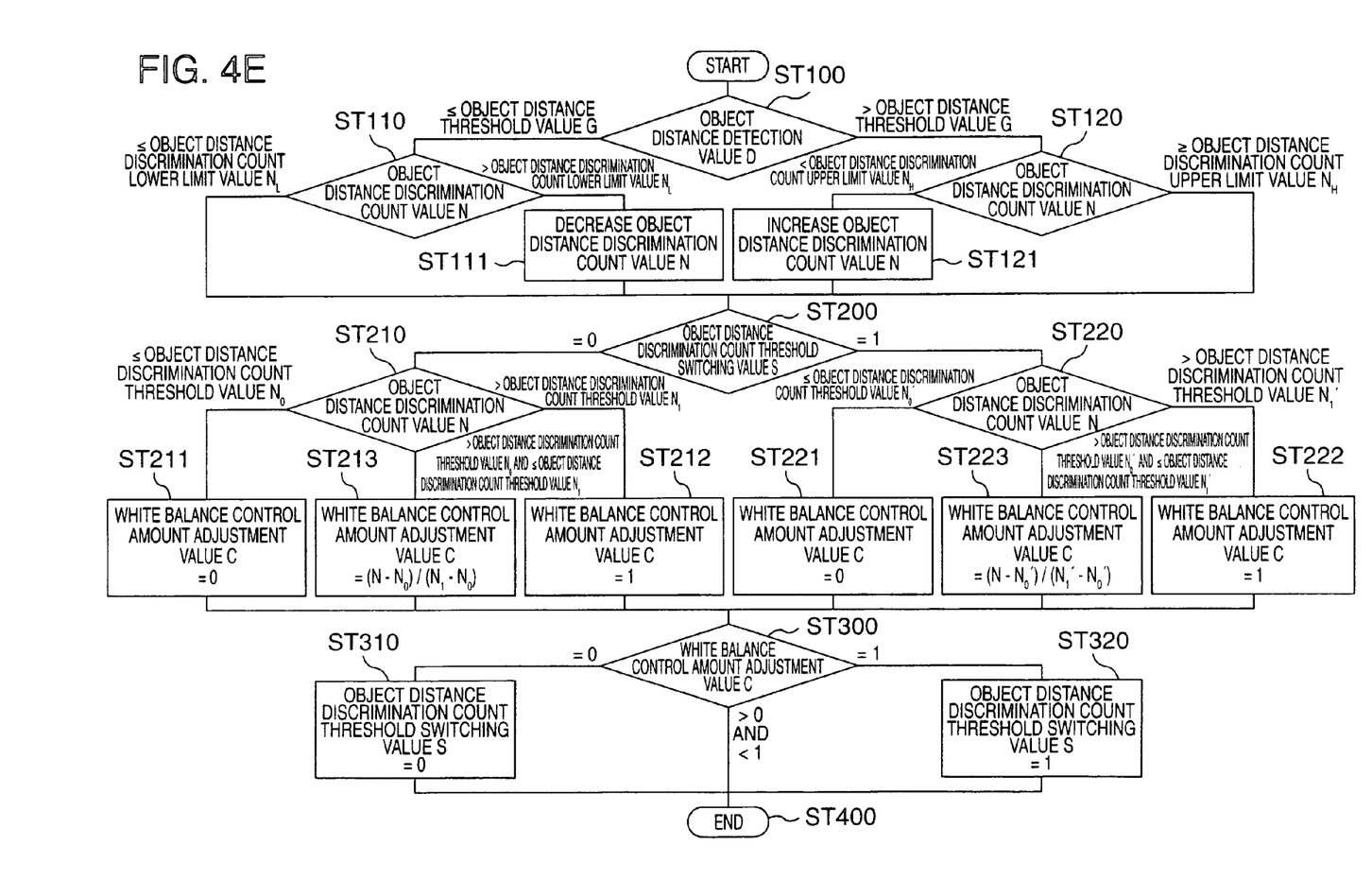

According to the setting method of the white balance control amount adjustment value C shown in FIG. 4E, by arbitrarily setting the object distance discrimination count threshold values $N_0$, $N_1$, $N_0'$, and $N_1'$, the white balance control amount adjustment value C can be variably set.

For example, in the case of setting the white balance control amount adjustment value C as shown in FIG. 4A, it is sufficient to set $$N_0=N_1=N_0'=N_1'$$

For example, in the case of setting the white balance control amount adjustment value C as shown in FIG. 4B, it is sufficient to set $$N_0=N_0'<N_1=N_1'$$

For example, in the case of setting the white balance control amount adjustment value C as shown in FIG. 4C, it is sufficient to set $$N_0=N_1<N_0'=N_1'$$

For example, in the case of setting the white balance control amount adjustment value C as shown in FIG. 4D, it is sufficient to set $$N_0<N_1<N_0'<N_1'$$

In the specific examples shown in FIGS. 4A to 4D, the lower limit of the white balance control amount adjustment value C is set to "0", that is, the correcting operation for the white balance deviation is stopped. However, the invention is not limited to it but it is also possible to construct in a manner such that (0<the white balance control amount adjustment value C<1) is set, that is, as a speed reducing operation of the correction for the white balance deviation, it is also possible to construct in a manner such that the correcting operation for the white balance deviation is not stopped.

It is also possible to construct in a manner such that the object distance discriminating counter is omitted to thereby simplify the construction and the comparison result of the object distance detection value D and the object distance threshold value G ("1" if the object distance detection value D> the object distance threshold value G; "0" if the object distance detection value D≦ the object distance threshold value G) is used as it is as a white balance control amount adjustment value C. A similar effect can be also obtained by such a construction.

Figure 5A:
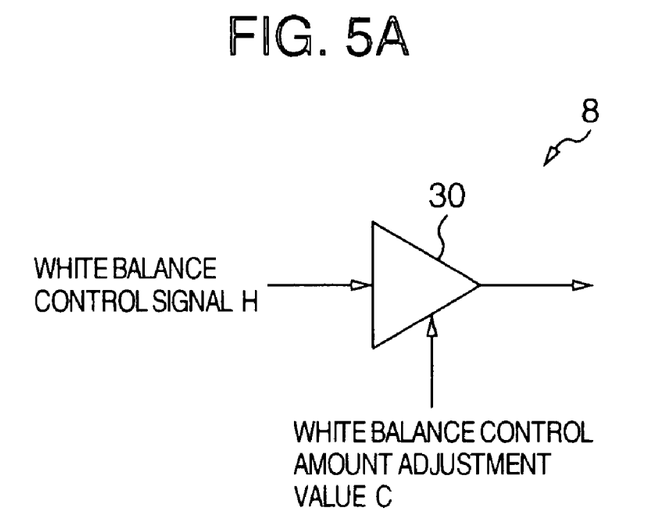
FIGS. 5A and 5B are diagrams each showing a specific example of an adjusting method of a white balance control amount in the embodiment shown in FIG. 1.
Figure 5B:
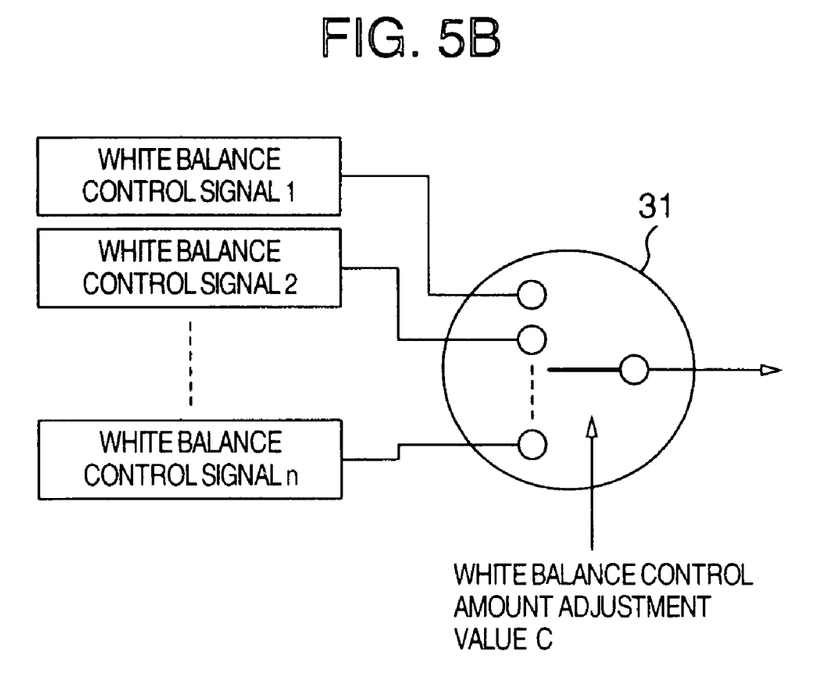

In the foregoing embodiment, in the white balance control circuit 8 shown in FIG. 1, as shown in FIG. 5A, the white balance control amount is adjusted by multiplying a white balance control signal H by the white balance control amount adjustment value C by a multiplying circuit 30. However, as shown in FIG. 5B, it is also possible to construct in a manner such that white balance control signals corresponding to a plurality of white balance control amounts are preset and the proper one of the white balance control signals is selected by a selecting circuit 31 in accordance with the white balance control amount adjustment value C.

In the embodiment, first, the object distance threshold value G is obtained on the basis of the zoom magnification E and the object illuminance F and compared with the object distance detection value D, thereby forming the white balance control amount adjustment value C. However, the invention is not limited to it but any method can be used so long as the white balance control amount adjustment value C is formed by using the zoom information (magnitude of the zoom), object brightness information (brightness of the object), and object distance detection information (magnitude of the object distance). For example, besides the zoom magnification E, any parameter such as focal distance f, angle of view θ, zoom lens position P, or the like can be used so long as the magnitude of the zoom can be detected. Besides the zoom lens (variable focal distance lens), the invention can be also applied to a fixed focal distance lens or the like. Besides the object illuminance F, any parameter such as object luminance Y or the like can be used so long as the brightness of the object can be detected. Besides the brightness information formed from the image pickup device, information obtained from various sensors such as illuminance sensor, luminance sensor, and the like can be also applied. As an object distance detection value D, besides the information of the focal distance or position of the focus lens, information obtained from various distance sensors can be also applied.

Further, in the embodiment, in the white balance control circuit 8, the white balance control signal formed on the basis of the information A of the white balance deviation from the signal processing circuit 5 is adjusted. However, the invention is not limited to it but, for example, it is also possible to construct in a manner such that in the white balance control circuit 8, the information A of the white balance deviation from the signal processing circuit 5 is adjusted by the white balance control amount adjustment value C and, thereafter, the white balance control signal is formed.

Further, in the embodiment, the processes for the white balance control which are executed by the white balance control circuit 8, the white balance control amount adjustment value setting circuit 9, the object distance threshold value setting circuit 10, and the like can be also executed by software of a microcomputer or the like.

As described above, according to the embodiment of the invention, even in the case where the object which occupies almost the whole image pickup picture plane is a white object or a light source, the white balance control amount adjustment value is changed on the basis of the brightness information of the object. Therefore, the control amount for the correction for the white balance deviation can be properly changed, the white balance deviation can be optimally corrected, and an image of further high picture quality can be obtained.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An imaging apparatus, comprising:
   object distance detecting means for detecting distance to an object;
   zoom value detecting means for detecting a zoom value of an optical system;
   object brightness detection means for detecting brightness of the object;
   white balance controlling means for detecting an achromatic portion of the object based on a chrominance signal generated from an output signal of an imaging element through the optical system, and controlling gain of the chrominance signal in accordance with a shift amount of white balance detected from the achromatic portion, wherein white balance is controlled such that:
   while object distance detection information is fixed, if zoom value information changes when object brightness information is a first value, white balance adjustment is made or not made according to a first threshold value; and
   if the zoom value information changes, when the object brightness information is a second value different from the first value, white value adjustment is made or not made according to a second threshold value different from the first threshold value.

2. An imaging apparatus according to claim 1, wherein:
   if the zoom value information is equal to or more than the first threshold value when the object brightness information is the first value white balance adjustment is not made and if it is less than the first threshold value white balance adjustment is made; and
   if the zoom value information is equal to or more than the second threshold value, white balance adjustment is not made, and if it is less than the second threshold value white balance is made.

3. An imaging apparatus, comprising:
   object distance detecting means for detecting a distance to an object;
   zoom value detecting means for detecting an optical system zoom value;
   object brightness detection means for detecting brightness of the object; and
   white balance controlling means for detecting an achromatic portion of the object based on a chrominance signal generated from an output signal of an imaging element through the optical system, and controlling gain of the chrominance signal in accordance with shift amount of white balance detected from the achromatic portion, wherein white balance is controlled such that:
   while object distance detection information is fixed, if object brightness information changes when zoom value information is a first value, white balance adjustment is made or not made according to a first threshold value; and
   if the object brightness information changes when the zoom value information is a second value different from the first value, white balance adjustment is made or not made according to a second threshold value different from the first threshold value.

4. An imaging apparatus according to claim 3, wherein:
   if the object brightness information is more than the first threshold value when the zoom value information is the first value white balance adjustment is made, and if it is equal to or less than the first threshold value the white balance adjustment is not made; and if the object brightness information is more than the second threshold value when the zoom value information is the second value white balance adjustment is made, and if it is equal to or less than the first threshold value white balance is not made.

5. An imaging apparatus, comprising:

object distance detecting means for detecting distance to an object;

zoom value detecting means for detecting an optical system zoom value;

object brightness detecting means for detecting brightness of the object;

white balance controlling means for detecting an achromatic portion of the object based on a chrominance signal generated from an output signal of an imaging element through the optical system, and controlling gain of the chrominance signal in accordance with a shift amount of white balance detected from the achromatic portion, wherein white balance is controlled such that:

while zoom value is fixed, and if object brightness information changes when object distance detection information is a first value, white balance adjustment is made operative or not made according to a first threshold value;

if the object brightness information changes when the object distance detection information is a second value different from the first value, white value adjustment is made or not made according to a second threshold value different from the first threshold value;

if the object brightness information is more than the first threshold value when the object distance detection information is the first value the white balance adjustment is made, and if it is equal to or less than the first threshold value white balance adjustment is not made; and if the object brightness information is more than the second threshold value when the object distance detection information is the second value white balance adjustment is made, and if it is equal to or less than the second threshold value white balance is not made.

6. An imaging apparatus, comprising:

object distance detecting means for detecting distance to an object;

zoom value detecting means for detecting an optical system zoom value;

object brightness detection means for detecting brightness of the object; and white balance controlling means for detecting an achromatic portion of the object based on a chrominance signal generated from an output signal of an imaging element through the optical system, and controlling gain of the chrominance signal in accordance with shift amount of white balance detected form the achromatic portion, wherein, white balance is controlled such that:

while zoom value information is fixed, if object distance detection information changes when object brightness information is a first value, white balance adjustment is made or not made according to a first threshold value;

if the object distance detection information changes when the object brightness information is a second value different from the first value white balance adjustment is made or made not according to the second threshold value different from the first threshold value;

if the object distance detection information is more than the first threshold value when the object brightness information is the first value white balance adjustment is made, and if it is equal to or less than the first threshold value white balance adjustment is not made; and if the object distance detection information is more than the second threshold value when the object brightness information is the second value white balance adjustment is made, and if it is equal to or less than the second threshold value white balance adjustment is not made.

* * * * *